(12) United States Patent
Schiller

(10) Patent No.: US 9,850,105 B1
(45) Date of Patent: Dec. 26, 2017

(54) VERTICAL AUTOMATIC ADDITION TONG APPARATUS

(71) Applicant: Contractors & Industrial Supply Company, Inc., Nashville, TN (US)

(72) Inventor: Tom D. Schiller, Franklin, TN (US)

(73) Assignee: Contractors & Industrial Supply Company, Inc., Nashville, TN (US)

( * ) Notice: Subject to any disclaimer, the term of this patent is extended or adjusted under 35 U.S.C. 154(b) by 0 days.

(21) Appl. No.: 15/146,877

(22) Filed: May 4, 2016

Related U.S. Application Data

(60) Provisional application No. 62/156,844, filed on May 4, 2015.

(51) Int. Cl.
*B66C 1/48* (2006.01)
*B65G 47/90* (2006.01)

(52) U.S. Cl.
CPC ............... *B66C 1/48* (2013.01); *B65G 47/90* (2013.01)

(58) Field of Classification Search
CPC .... B66C 1/32; B66C 1/16; B66C 1/62; B66C 1/28; B66C 1/48; E21B 19/07; E21B 7/046; E04H 17/265; B66F 3/24; F16L 1/06
See application file for complete search history.

(56) References Cited

U.S. PATENT DOCUMENTS

| | | | |
|---|---|---|---|
| 2,226,652 A * | 12/1940 | York | B22D 41/06 294/106 |
| 2,494,775 A | 1/1950 | Moore | |
| 3,249,673 A | 5/1966 | Moore | |
| 3,517,954 A | 6/1970 | Snyder et al. | |
| 3,600,031 A * | 8/1971 | Coleman | B66C 1/66 294/110.1 |
| 3,752,896 A | 8/1973 | Zimmermann et al. | |

(Continued)

FOREIGN PATENT DOCUMENTS

| IT | 1052996 B | 8/1981 |
|---|---|---|
| IT | 1192885 B | 5/1988 |

(Continued)

OTHER PUBLICATIONS

U.S. Appl. No. 14/693,673, filed Apr. 22, 2015, Schiller.

(Continued)

*Primary Examiner* — Stephen A Vu
(74) *Attorney, Agent, or Firm* — Waller Lansden Dortch & Davis LLP; Matthew C. Cox

(57) ABSTRACT

An electrode lifting apparatus provides a mechanism for lifting a free electrode in a vertical orientation and moving the free electrode suspended below the lifting apparatus to a location for a joining procedure with another electrode or portion of an electrode. The electrode lifting apparatus also supports the free electrode during a joining procedure that includes driven rotation of the free electrode by an electrode torque station. The electrode lifting apparatus includes a bail and a body, the body having a yoke and a housing. First and second arms on the body connect the housing to the yoke. The body may angularly rotate relative to the relatively fixed bail about a reference vertical axis during driven rotation of the free electrode by the torque station. A threaded stem attached to the bail provides a threaded engagement with the yoke allowing such relative angular rotation in some embodiments.

13 Claims, 14 Drawing Sheets

(56) References Cited

U.S. PATENT DOCUMENTS

| | | | |
|---|---|---|---|
| 3,781,449 A | 12/1973 | Wolf et al. | |
| 3,790,204 A * | 2/1974 | Lighthipe, Jr. | B66C 1/62 |
| | | | 294/106 |
| 3,796,818 A | 3/1974 | Yuasa et al. | |
| 3,814,828 A | 6/1974 | Gazda | |
| 4,154,974 A | 5/1979 | Wynne | |
| 4,162,368 A | 7/1979 | Brazier | |
| 4,185,158 A | 1/1980 | Koga et al. | |
| 4,317,951 A | 3/1982 | Boudeau et al. | |
| 4,323,717 A | 4/1982 | Garner et al. | |
| 4,400,815 A | 8/1983 | Dunn et al. | |
| 4,420,838 A | 12/1983 | Dunn et al. | |
| 4,665,530 A | 5/1987 | Corbethau | |
| 4,703,492 A | 10/1987 | Sekiguchi et al. | |
| 4,736,384 A | 4/1988 | Sakai et al. | |
| 5,161,845 A * | 11/1992 | Carpenter, Jr. | B66C 1/625 |
| | | | 294/104 |
| 5,208,442 A | 5/1993 | Ahola et al. | |
| 5,255,285 A | 10/1993 | Alberl et al. | |
| 5,638,398 A | 6/1997 | Ikitsu et al. | |
| 5,757,841 A | 5/1998 | Ikitsu et al. | |
| 5,870,424 A | 2/1999 | Todoriki et al. | |
| 6,084,200 A | 7/2000 | Ahola | |
| 6,167,076 A | 12/2000 | Ignacio | |
| 6,265,690 B1 | 7/2001 | Fornsel et al. | |
| 7,547,861 B2 | 6/2009 | Jorgensen | |
| 7,660,337 B2 | 2/2010 | Teeples et al. | |
| 7,992,634 B2 * | 8/2011 | Angelle | E21B 19/07 |
| | | | 166/77.52 |
| 9,383,278 B1 | 7/2016 | Schiller | |
| 2008/0084907 A1 | 4/2008 | Lehr et al. | |
| 2010/0272146 A1 | 10/2010 | Piccardi | |
| 2011/0089617 A1 | 4/2011 | Reali et al. | |
| 2011/0274137 A9 | 11/2011 | Piccardi | |
| 2015/0233195 A1 * | 8/2015 | Smith | E21B 19/06 |
| | | | 414/22.63 |

FOREIGN PATENT DOCUMENTS

| | | |
|---|---|---|
| IT | 1297835 A1 | 8/1998 |
| JP | 3388329 | 3/2003 |

OTHER PUBLICATIONS

U.S. Appl. No. 14/693,862, filed Apr. 22, 2015, Schiller.
U.S. Appl. No. 14/796,964, filed Jul. 10, 2015, Schiller.
U.S. Appl. No. 14/693,652, filed Apr. 22, 2015, Schiller.
U.S. Appl. No. 15/198,949, filed Jun. 30, 2016, Schiller.

* cited by examiner

VERTICAL AUTOMATIC ADDITION TONG APPARATUS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of U.S. Provisional Patent Application Ser. No. 62/156,844 filed May 4, 2015 entitled ELECTRODE HANDLING APPARATUS AND METHODS, which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to devices for lifting and manipulating electrodes, and more particularly to devices for securing, handling and lifting electrodes in an upright, or vertical orientation before, during and after an electrode addition procedure.

Metal arc furnaces include large vessels for melting metal. Heat may be generated inside the furnaces using graphite electrodes across which electric current is passed. Heat is generated inside the furnace due to a high voltage arc formed by the current passing through one or more electrodes. The heat is used to melt metal.

During use, graphite electrodes are consumed within the furnace vessel, requiring electrodes to be replaced over time. As electrode material is consumed in the furnace, the electrode is shortened to a length where it is no longer independently usable. However, a partially-consumed electrode may be joined to a second partially-consumed or complete electrode to form a joined electrode that can be used. Thus, the partially-consumed electrode may still be useful when placed in combination with a second electrode portion.

Electrodes may be joined in an end-to-end configuration using a threaded joint in some applications. When electrodes are combined, electrical conductivity is generally maintained across the joint, and electricity may be passed from one electrode to the second in the joint electrode. A threaded joint is commonly used to join electrodes. The joining procedure requires at least one electrode to be rotated relative to a second electrode such that a threaded engagement occurs.

The joining process typically requires two stages. During a first stage, the first electrode is rotated relative to the second electrode to allow loose engagement of the corresponding threads. Rotation during this stage encounters relatively little resistance as the threads are rotating. This may be referred to as a spin-down rotation when a free electrode is spun about its longitudinal axis relative to a fixed electrode below the free electrode, to allow the threads to engage.

Before use, the threaded electrode joint must be tightened to a predetermined manufacturer's suggested torque value. A second stage of electrode joining occurs when the end walls of the two electrodes or other structures make contact, requiring greater force to torque the first electrode relative to the second electrode. During this stage, the torque applied generally increases as a function of angular position. This second stage may be referred to as a torque stage. Once a desired torque value, or a value within a desired torque range, is reached, force application is ceased and the electrodes are properly joined.

An improper torque application can damage threads, reduce electrical connectivity between the electrode sections, or cause failure of the joint. Such failure may be catastrophic where the separate electrode sections each weigh several hundred or even several thousand pounds. Because joined electrodes are typically moved inside an industrial setting using overhead transport rigging, joint failure can cause one or both electrode sections to crash down on equipment or workers, causing major damage or injury.

Conventional tools and methods for joining electrodes in a threaded joint include manually rotating one free electrode relative to a fixed electrode. This may be achieved using a manual wrench or other tool for grasping and rotating the free electrode. The applied torque may be measured manually using a torque gauge or manual torque wrench. The conventional manual joining technique is time-consuming for workers and may be dangerous in some applications due to the requirement that a worker be near the additional electrode operating the wrench. Additionally, manual procedures lead to variance in applied torque values as workers may not apply the same torque every time.

Others have attempted to solve the problems associated with manual joining of threaded electrodes by providing devices to assist in the torque application process. For example, U.S. Pat. No. 6,167,076 titled Electrode Wrench provides an apparatus for joining a threaded free electrode section with a threaded fixed electrode section for use in electric arc furnaces. The apparatus includes a driver and a plurality of pawls to grip the free electrode and turn it in one angular direction. The electrode wrench includes a pneumatic cylinder to apply torque against the free electrode in the second stage of joining. During use, a user may measure the pressure applied in the pneumatic cylinder and correlate the pressure to a range of torque values. Thus, a user may stop applying force once a pressure value corresponding to a desired torque range is reached. However, the electrode wrench typically does not provide independent verification, or feedback measurement of applied torque. The failure of such independent verification can lead to improper torque application on the free electrode and the undesirable and dangerous problems mentioned above.

During electrode addition processes, the free electrode is typically rotated about a vertical axis which coincides with the longitudinal axis of the free electrode that is being added to a fixed electrode positioned below. The fixed electrode includes the partially consumed electrode from the furnace, and it is generally suspended below a fixed electrode holder or joining apparatus. The fixed electrode has an exposed upper socket that receives a threaded post protruding from the lower end of the free electrode. Once the threaded post on the lower end of the free electrode is positioned above the threaded socket on the fixed electrode, rotation of the free electrode may be initiated. As the free electrode is spun about the vertical axis relative to the fixed electrode, the corresponding threads on the free and fixed electrodes engage, forming a threaded joint. During the rotation while the threads are engaged, the free electrode moves axially toward the fixed electrode as the threads advance. This axial motion of the free electrode presents a problem because the free electrode is suspended by an overhead lifting device such as an overhead crane. The tendency of the free electrode to be pulled axially toward the fixed electrode during spin-down thread engagement places axial stress on the free electrode, on the overhead lifting device, and on the threads. This axial stress may lead to damaged threads, a damaged joint, and/or a damaged lifting device secured at the upper end of the free electrode.

What is needed then are improved devices for retaining and positioning a free electrode relative to a fixed electrode to allow the free electrode to spin about its longitudinal axis and to travel axially toward the fixed electrode while being suspended.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an electrode lifting apparatus that may be used to lift and transport a free electrode. The electrode lifting apparatus includes a bail and a body below the bail. The body is angularly moveable relative to the bail about a reference vertical axis. The body includes a yoke and a housing. The housing defines an interior space shaped to receive a portion of the upper end of a free electrode. The housing also includes an upper housing wall that provides an axial stop for the upper end of the free electrode when the lifting apparatus is lowered onto the free electrode. The yoke and the housing are connected by first and second arms. First and second grip members are disposed on the housing for engaging the upper end of the free electrode.

Another aspect of the present disclosure provides an electrode lifting apparatus that utilizes a camming action to radially advance first and second grip members toward the sides of the upper end of an electrode. The grip members engage the electrode sufficiently to allow the electrode to be lifted and transported below the electrode lifting apparatus.

A further aspect of the present disclosure provides an electrode lifting apparatus that includes a bail and a body below the bail, wherein the body is both angularly moveable relative to the bail about a reference vertical axis and wherein the body is axially moveable relative to the bail along the reference vertical axis.

Yet another aspect of the present disclosure provides an electrode lifting apparatus that includes a bail and a body below the bail, the body including a yoke and a housing, wherein the body is angularly moveable relative to the bail about a reference vertical axis, wherein the body is axially moveable relative to the bail along the reference vertical axis, and wherein the yoke is vertically moveable relative to the housing along the reference vertical axis.

Numerous other objects, advantages and features of the present disclosure will be readily apparent to those of skill in the art upon a review of the following drawings and description of a preferred embodiment.

DETAILED DESCRIPTION

Figure 1:
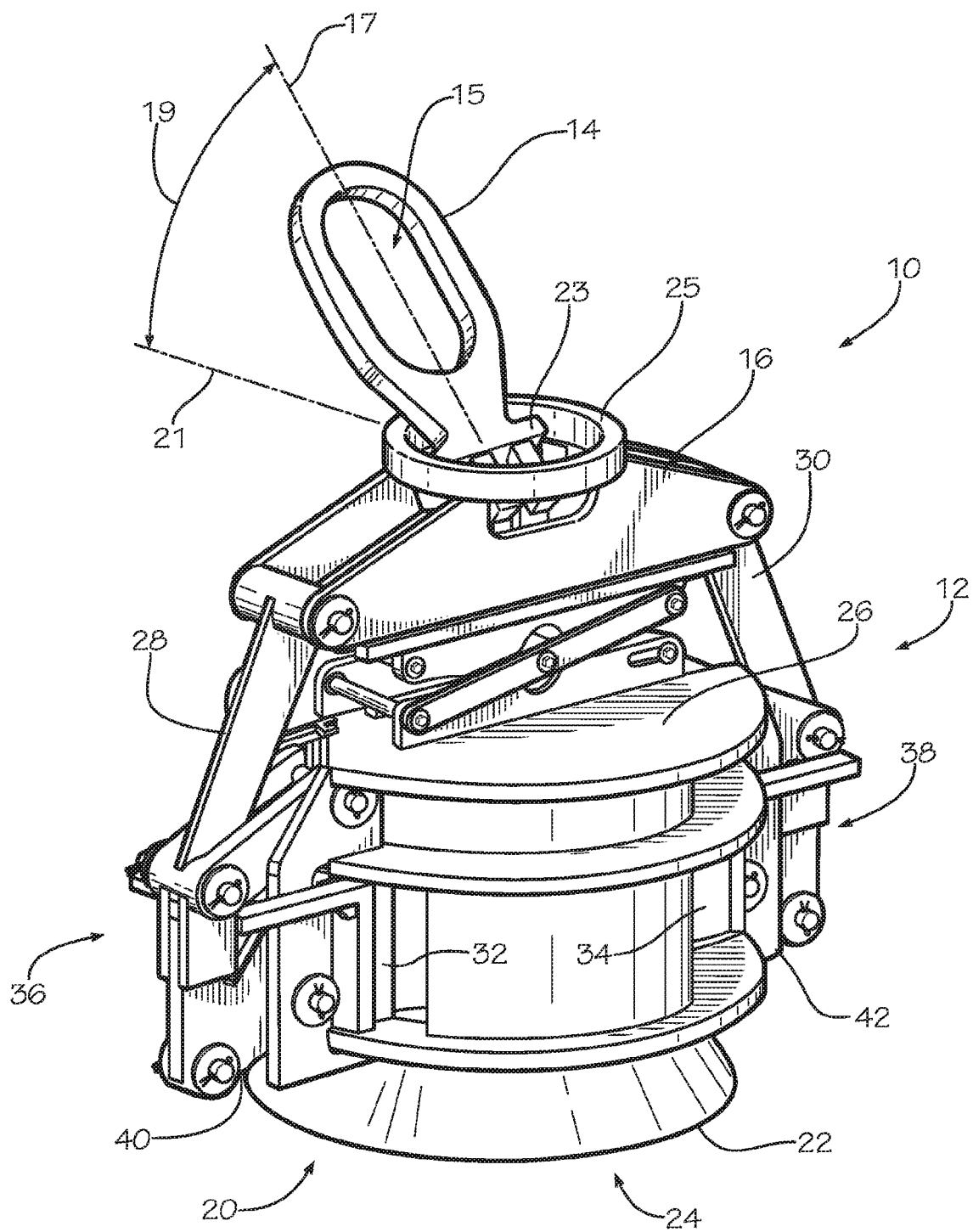
FIG. 1 illustrates a perspective view of an embodiment of a vertical automatic addition tong for handling an electrode in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring to the drawings, FIG. 1 illustrates a perspective view of an embodiment of a vertical automatic addition tong, or electrode lifting apparatus 10, in accordance with the present disclosure. Electrode lifting apparatus 10 may be described as a vertical tong because it is configured to lift a cylindrical electrode in vertical orientation. Electrode lifting apparatus 10 also may be described as an addition tong because it is configured to add a free electrode to a fixed electrode in an electrode addition, or electrode joining, procedure. Additionally, electrode lifting apparatus 10 may be described as an automatic tong because it includes an ability to automatically rotate a portion of the apparatus as the free electrode is rotated during a spin down procedure relative to a fixed electrode.

Electrode lifting apparatus 10 includes a body 12 and a bail 14. Body 12 includes two main portions, a yoke 16 and a housing 20 positioned below the yoke 16. The housing and yoke are generally moveable relative to each other over a limited range of motion in a vertical direction. Yoke 16 is attached to housing 20 using a first arm 28 and a second arm 30. First arm 28 is pivotally attached to yoke 16 at a first pivoting arm yoke joint 29, and second arm 30 is pivotally attached to yoke 16 at a second pivoting arm yoke joint 31 opposite the first pivoting arm yoke joint 2, shown in FIG. 3. First arm 28 is secured to housing 20 via a first arm linkage 36 disposed at the lower end of first arm 28, and second arm 30 is secured to housing 20 via a second arm linkage 38 disposed at the lower end of second arm 30.

First arm 28 includes a first arm spring 60 in some embodiments. First arm 28 includes a moveable arm member that is extendible along its longitudinal axis in some embodiments. First arm spring 60 provides cushioning for the first arm as the weight of a free electrode is initially supported by the electrode lifting apparatus 10. Similarly, second arm 30 includes a second arm spring 62 in some embodiments. Second arm 30 includes a moveable arm member that is extendible along its longitudinal axis in some embodiments. Second arm spring 62 provides cushioning for the second arm as the weight of a free electrode is initially supported by the electrode lifting apparatus 10.

Figure 2:
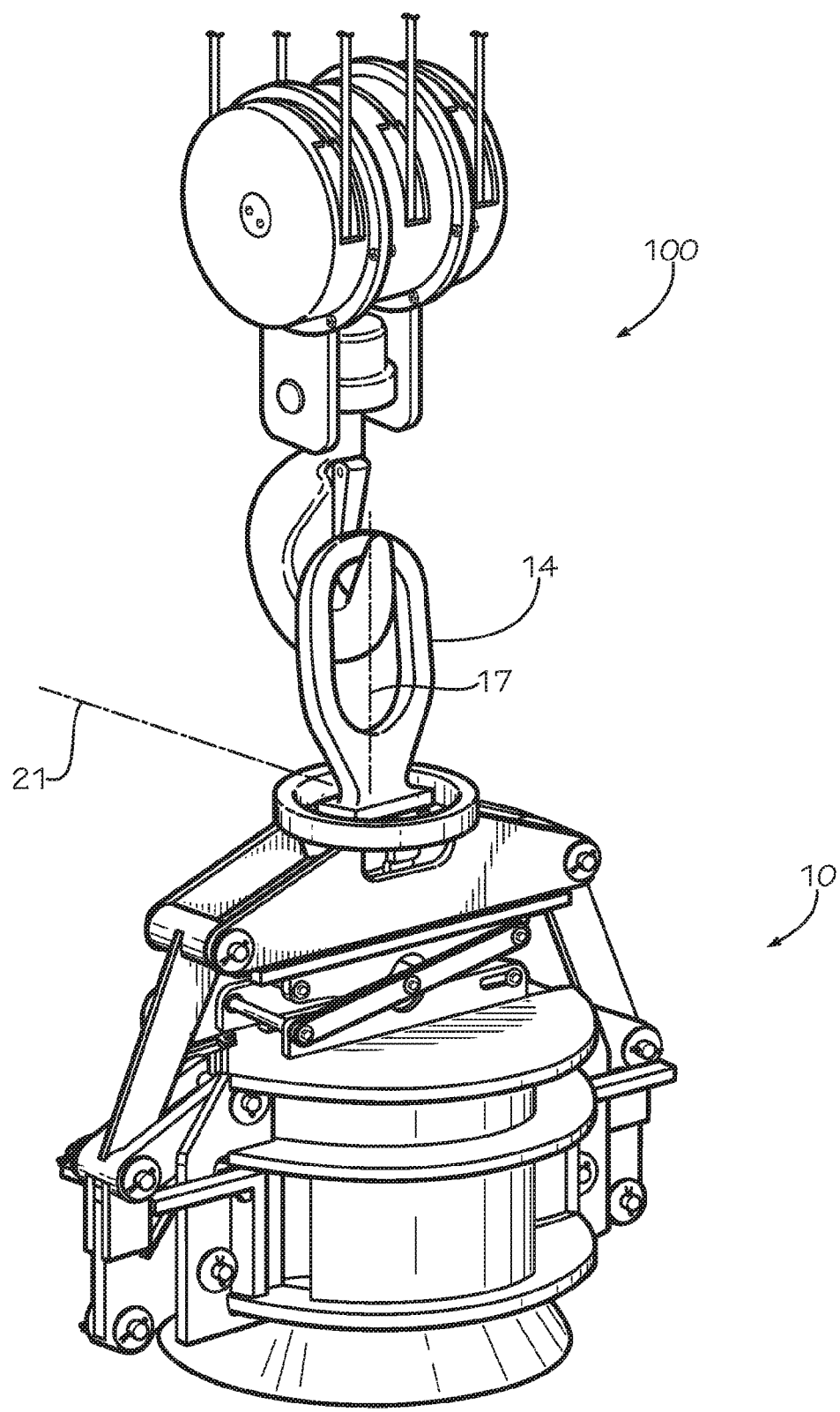
FIG. 2 illustrates a perspective view of an embodiment of a vertical automatic addition tong for handling an electrode in accordance with the present disclosure.

Electrode lifting apparatus 10 is configured to be lifted by an overhead lifting device such a crane, cable, hook, or other suitable overhead lifting device. Electrode lifting apparatus 10 includes a bail 14 having a bail opening 15 through which a lifting device such as a hook may be passed. Bail 14 is connected to yoke 16 at a pivoting bail joint 26. As seen in FIGS. 1 and 2, electrode lifting apparatus 10 includes a bail stop 25 attached to yoke 16. Bail stop 25 provides an angular stop for the bail 14 such that bail orientation axis 17 is positioned at an acute angle relative to a horizontal reference axis 21 when bail 14 is at a resting position. As such, a hook 100 may be introduced to receive bail 14 through bail opening 15. By providing a bail stop 25 that angularly stops bail 14 at a bail orientation 17 with a bail angle 19 of between about thirty and about sixty degrees, hook 100 may be introduced for attachment to bail 14 from a resting position. In some embodiments, bail stop 25 is positioned such that bail 14 is retained at a bail angle 19 of about forty-five degrees.

Figure 4:
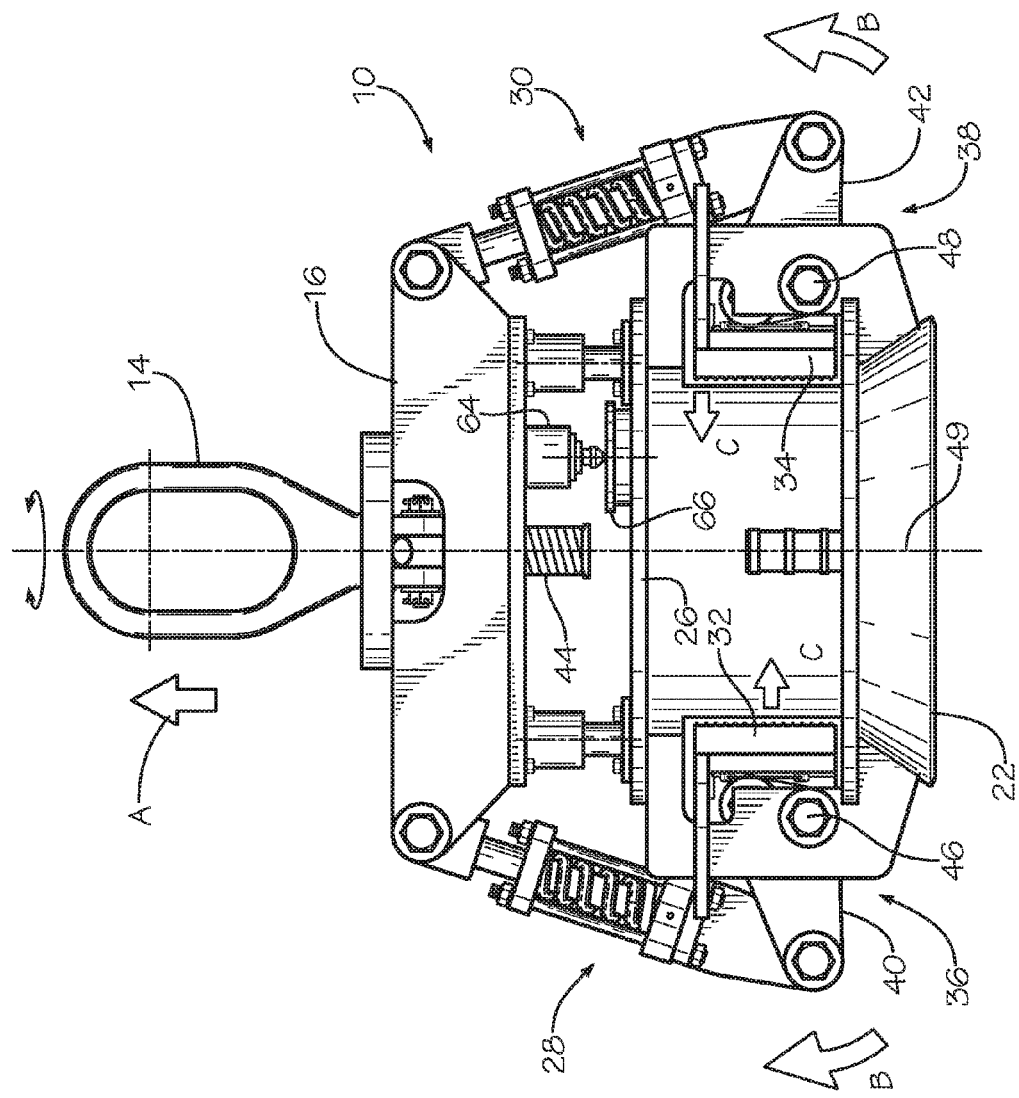
FIG. 4 illustrates an elevation view of an embodiment of a vertical automatic addition tong for handling an electrode in accordance with the present disclosure.
Figure 5:
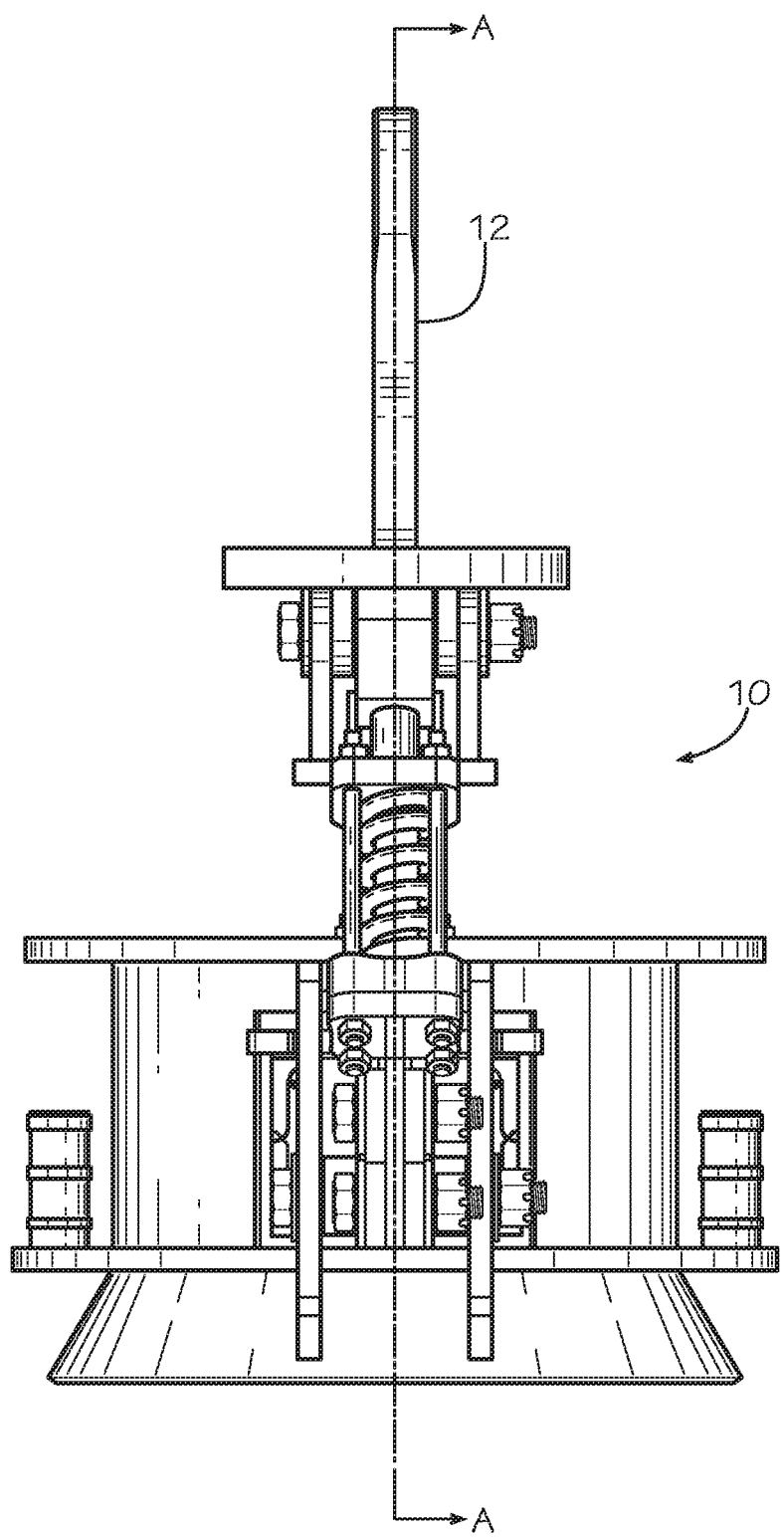
FIG. 5 illustrates a side view of an embodiment of a vertical automatic addition tong for handling an electrode in accordance with the present disclosure.

Bail 14 is rotatable relative to yoke 16 about a vertical axis 49, as seen in FIG. 4. Thus, when bail is held in a relatively stationary position by hook 100, body 12 including yoke 16 and housing 20 may collectively rotate about vertical axis 49 in either angular direction. Bail stop 25 includes an annular ring positioned around bail 14 in some embodiments so that bail stop 25 will be effective to angularly stop bail 14 from pivoting downward toward the reference horizontal axis 21 regardless of the relative angular positioning between body 12 and bail 14.

Referring further to FIGS. 1-4, yoke 16 in some embodiments includes two substantially parallel upright plates separated by a yoke gap. The upper ends of first and second arms 28, 30 are pivotally secured in the yoke gap between the parallel upright plates on yoke 16. A yoke base 52 is positioned on yoke 16 spanning the yoke gap between the parallel upright plates on yoke 16. Yoke base 52 includes a substantially horizontal member attached to each of the upright plates on the yoke 16.

Figure 6:
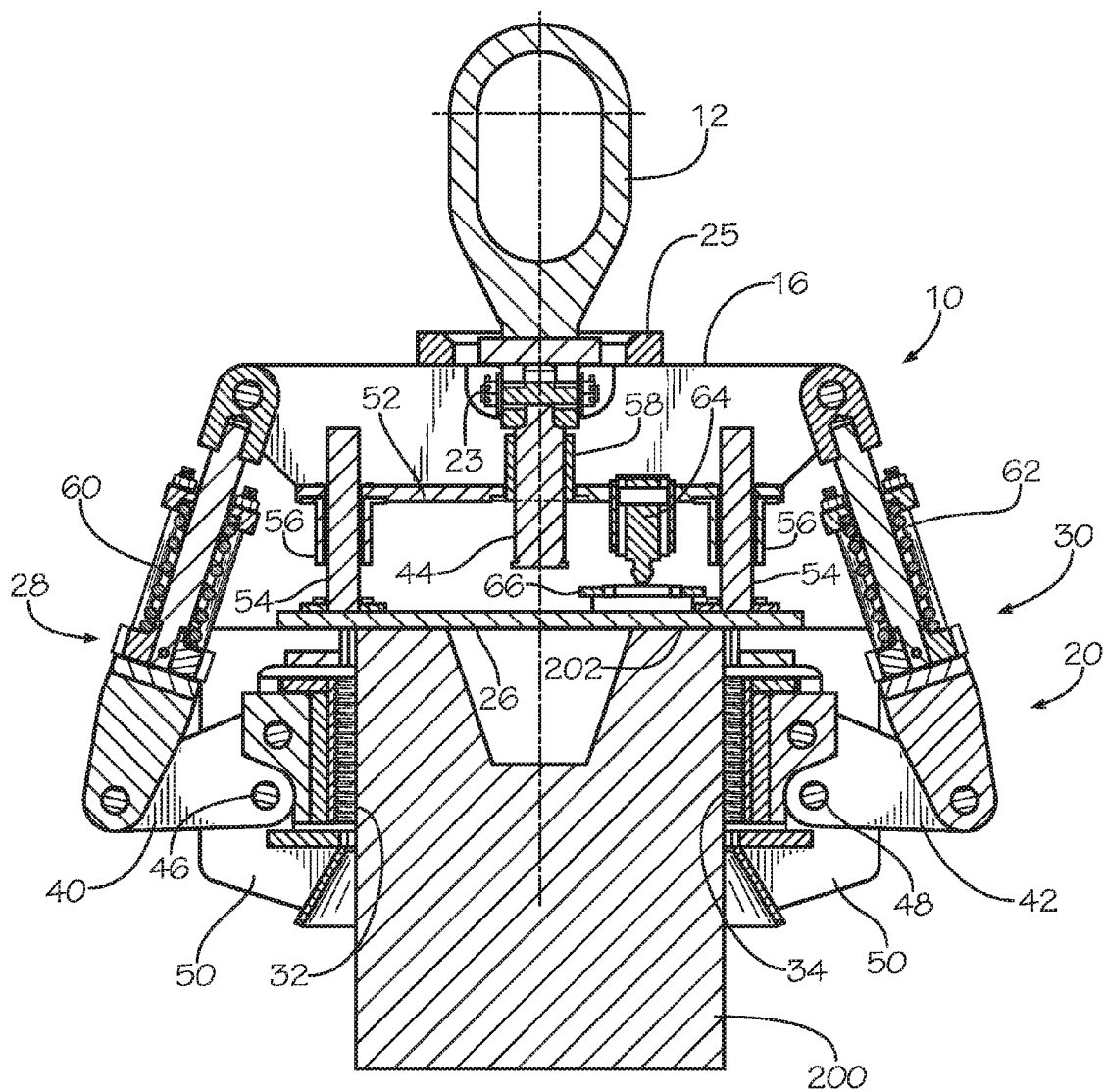
FIG. 6 illustrates a partial cross-sectional view of an embodiment of a vertical automatic addition tong for handling an electrode in accordance with the present disclosure.

Bail 14 is secured to yoke 16 via threaded stem 44, as seen in FIG. 6. Threaded stem 44 may also be referred to as a vertical threaded stem 44 in some embodiments. Yoke 16 is secured to threaded stem 44 at a pivoting bail joint 23. A pivot pin may be disposed between bail 14 and threaded stem 44 in some embodiments to provide a pivoting joint. Threaded stem 44 includes a cylindrical member having outer stem threads. In some embodiments, the stem threads have substantially the same thread axial thread count as the electrode for which the lifting apparatus is configured to be used.

The threaded stem 44 engages the yoke at a threaded collar 58 on the yoke 16. In some embodiments, threaded collar 58 is rigidly fixed on yoke 16. Threaded collar 58 may include a threaded portion on yoke base 52 spanning the yoke gap. In other embodiment, threaded collar 58 includes a separate bushing with a hollow passage having a threaded interior wall, wherein the stem threads engage the threads on the interior wall of the threaded collar 58. Threaded collar 58 includes a threaded collar flange in some embodiments to provide an interconnection with yoke 16. During use, bail 14 along with its attached threaded stem 44 may remain substantially stationary while suspended from a hook, and yoke 16 may rotate relative to bail 14 via relative threaded rotation between threaded stem 44 and threaded collar 58 fixed to yoke 16. In additional embodiments, threaded collar 58 includes a threaded passage defined directly on yoke 16, such that threaded stem 44 directly engages a threaded collar 58 integrally formed on yoke 16. For example, threaded collar 58 may include a threaded passage on yoke base 52.

Figure 3:
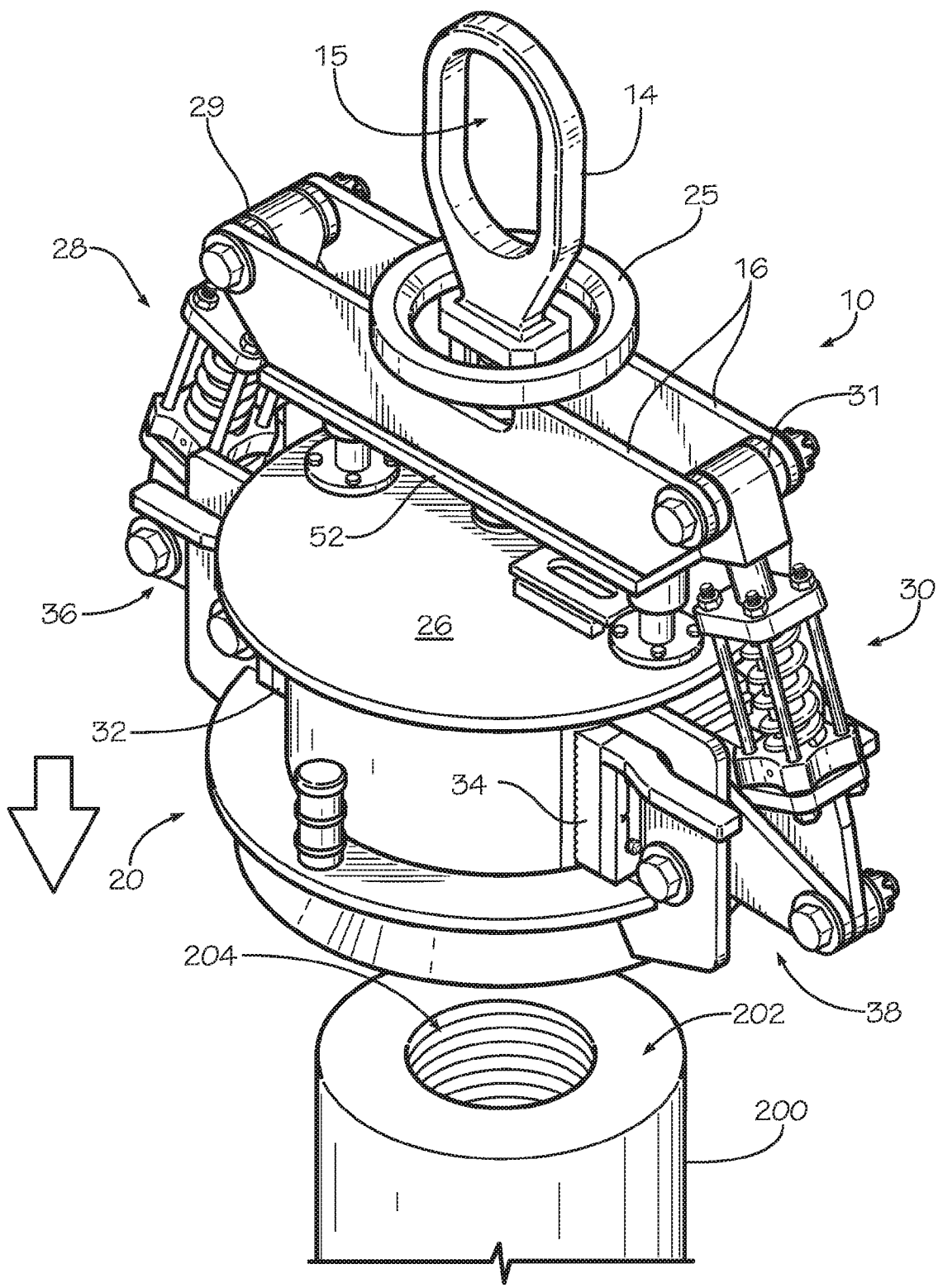
FIG. 3 illustrates a perspective view of an embodiment of a vertical automatic addition tong for handling an electrode in accordance with the present disclosure.

Referring further to FIGS. 1-6, housing 20 includes a bell-shaped structure having a substantially hollow interior, a circumferential side wall, and a bottom opening 24. Housing 20 includes an upper housing wall 26 spanning across the housing 20. The lower side of housing 20 includes a housing opening 24 shaped to receive the upper end 202 of an electrode 200, as seen in FIG. 3. During use, housing 20 is lowered onto a stationary vertical electrode such that upper end 202 is received in the interior space in the housing 20 via the housing opening 24. Housing 20 may be lowered directly onto the upper end 202 of an electrode 200 using a hook or other device attached to electrode lifting apparatus 10 via bail 14.

As seen in FIG. 6, electrode lifting apparatus 10 is lowered onto electrode 200 until upper end 202 of electrode 200 contacts upper housing wall 26. From this position, electrode lifting apparatus 10 may be lowered slightly further such that yoke 16 travels vertically downwardly toward housing 20. Yoke 16 may travel relative to housing 20 in a vertical direction across a limited range of travel. One or more guides are positioned between yoke 16 and housing 20 to prevent angular movement of yoke 16 relative to housing 20. For example, as seen in FIG. 6, first and second guide posts 54 are fixed to housing 20 and extend upwardly from the top side of upper housing wall 26 toward yoke 16. Each of first and second guide posts 54 are received in a corresponding travel opening 56 in yoke 16 In some embodiments, first and second travel openings 56 are defined in yoke base 52. Each guide post 54 is able to freely travel through its corresponding travel opening 56. In some embodiments, each travel opening 56 includes a cylindrical bushing through which a corresponding guide post travels. In alternative embodiments, the guide between yoke 16 and housing 20 to prevent relative angular movement includes a scissor linkage as shown in FIG. 1 and FIG. 2. The scissor linkage includes two or more upright plates pivotally joined to each other and to yoke 16 and housing 20.

Referring further to FIG. 6, after upper end 202 of electrode 200 contacts upper housing wall 26, further lowering of electrode lifting apparatus 10 allows yoke 16 to travel vertically downwardly toward housing 20. This relative movement causes latch 64 to engage a corresponding latch retainer 66 on the top side of upper housing wall 26. Latch 64 provides a mechanical linkage to retain the tong in an open position by retaining a fixed distance between yoke 16 and housing 10 in a resting state. However, when electrode lifting apparatus 10 is lowered onto an electrode 200, the electrode upper end 202 contacts the upper housing wall 26, thereby allowing yoke 16 to be lowered an additional distance toward the housing 20. This additional travel of yoke 16 toward housing 20 actuates latch 64, thereby disengaging latch 64 from latch retainer 66. The disengagement of latch 64 from latch retainer 66 allows additional vertical travel between yoke 16 and housing 20. The additional travel specifically allows a greater distance between yoke 16 and housing 20. The additional travel allows the lifting apparatus to move from a resting, or open, position to an active, or closed position.

Figure 7:
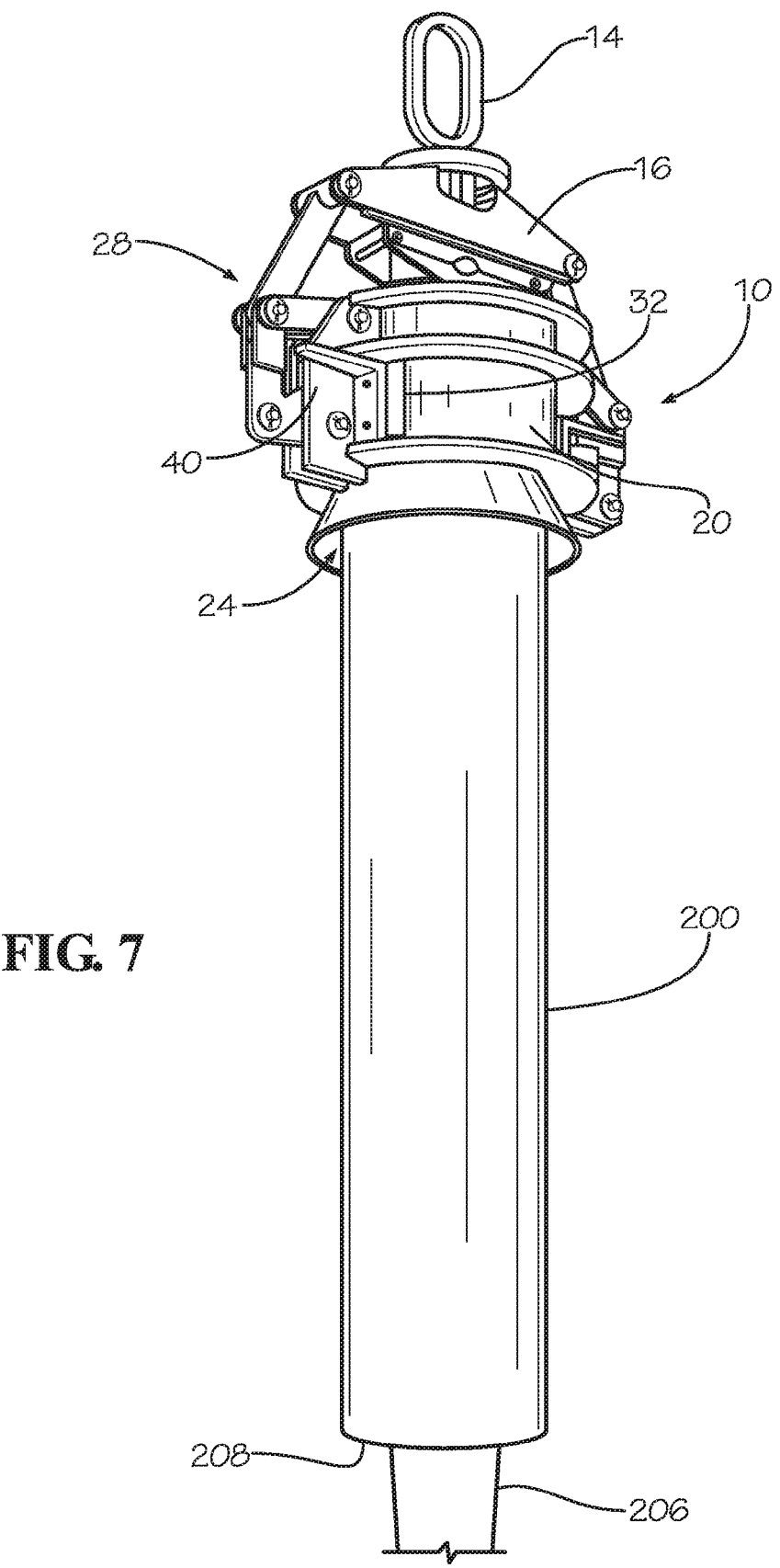
FIG. 7 illustrates a perspective view of an embodiment of a vertical automatic addition tong for handling an electrode in accordance with the present disclosure.

As seen in FIG. 4, when latch 64 is disengaged from latch retainer 66, upward movement of the bail 14 by an overhead lifting device such as a crane or hook denoted by arrow "A" imparts an upward pulling force on yoke 16. The upward force on yoke 16 causes an upward pulling force on first and second arms 28 and 30. First arm 28 is attached to housing 20 at first linkage 36. First linkage 36 includes a first cam 40 attached to first grip 32. First cam 40 is pivotally attached to housing 20 at a first cam pivot 46. Similarly, second linkage 38 includes a second cam 42 attached to second grip 34. Second cam 42 is pivotally attached to housing 20 at a second cam pivot 48. When yoke 16 is pulled upwardly via bail 14, first arm 28 pulls upwardly on first cam 40, and second arm 30 pulls upwardly on second cam 42. The upward force causes first cam 40 to rotate about first cam pivot 46 and causes second cam 42 to simultaneously rotate about second cam pivot 48. The camming action of first and second cams 40, 42 causes first grip 32 and second grip 34 to simultaneously travel radially inwardly toward vertical axis 49. When the upper end 202 of an electrode 200 is received in the housing 20, the camming action of first and second cams 40, 42 causes the first and second grips 32, 34 to advance radially toward and to engage the side of the electrode 200 in a gripping engagement. The first and second grips 32, 34 each include an engagement face having a plurality of grooves and teeth. The teeth are configured to grip the side of an electrode 200. First and second grips 32, 34 also include a concave, curved side facing the electrode 200, or facing the interior of the housing 20. Each curved side includes a curvature profile substantially matching the semi-cylindrical profile of the corresponding local engagement region of an electrode surface. Due to the camming action of first and second cams 40, 42, a mechanical advantage is gained in application of first and second grips 32, 34 against the sides of an electrode received in the housing 20. First grip 32 grips a first side of the electrode, and second grip 34 grips a second side of the electrode. The camming action of first and second cams 40, 42 provides a sufficient amount of force against first and second grips 32, 34 to engage an electrode and to maintain engagement while the electrode is lifted and suspended below the electrode lifting apparatus 10. During use, once the first and second grips 32, 34 contact and fully engage the sides of an electrode received in housing 20, the relative travel between yoke 16 and housing 20 stops, and the entire electrode lifting apparatus 10 including yoke 16, housing 20, and an electrode gripped between first and second grips 32, 34 is raised vertically, as shown in FIG. 7. The first and second linkages articulate during lifting of an electrode, and the resulting camming action of the first and second cams 40, 42 provide a positive lock on the electrode that grips tighter as gravity pulls the mass of the free electrode downwardly.

Figure 16:
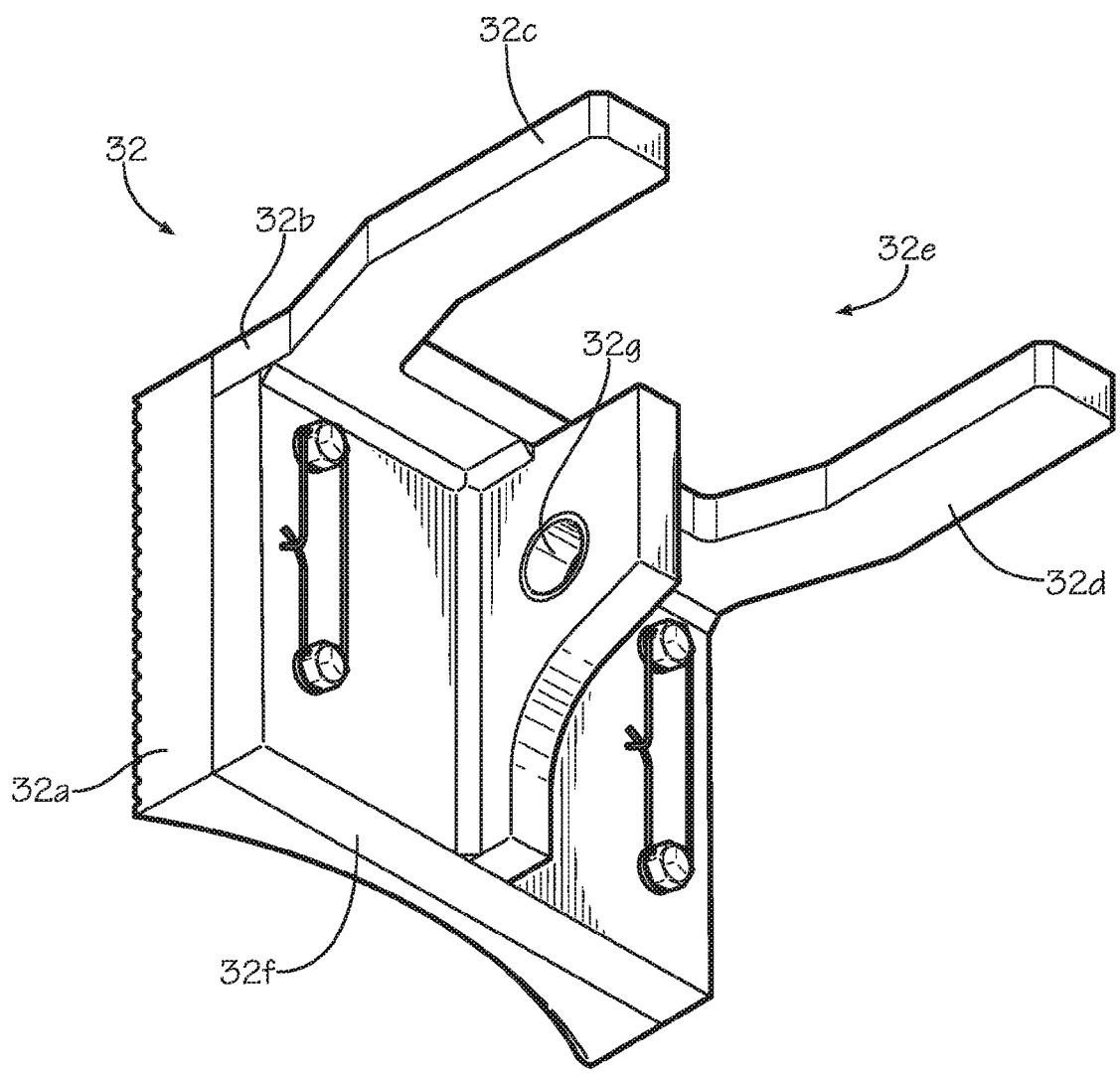
FIG. 16 illustrates a perspective view of an embodiment a grip member in accordance with the present disclosure.

As shown in FIG. 16, in some embodiments, each grip member includes a grip face 32a including a plurality of grip teeth. Grip face 32a is secured to a grip body 32b having a grip backing plate 32f and first and second grip stabilizer posts 32c, 32d protruding from the grip backing plate 32f at a substantially perpendicular orientation. A grip stabilizer gap 32e is defined between the first and second grip stabilizer posts 32c, 32d. The grip member is secured to a corresponding cam member at a grip pivot 32g. A portion of the housing is received in the grip stabilizer gap 32e to prevent the grip member from yawing from side to side or becoming misaligned as the grip member is angularly advanced or retracted relative to the housing 20 during the camming action of the first and second cams.

Once the free electrode is grasped between first and second grips 32, 34, the entire assembly, including the lifting device 10 and the electrode 200 suspended below the lifting device 10, may then be transporting using an overhead lift or crane to a desired location to allow the suspended free electrode 200 to be joined with a partially-consumed electrode, as shown in FIG. 7.

Figure 8:
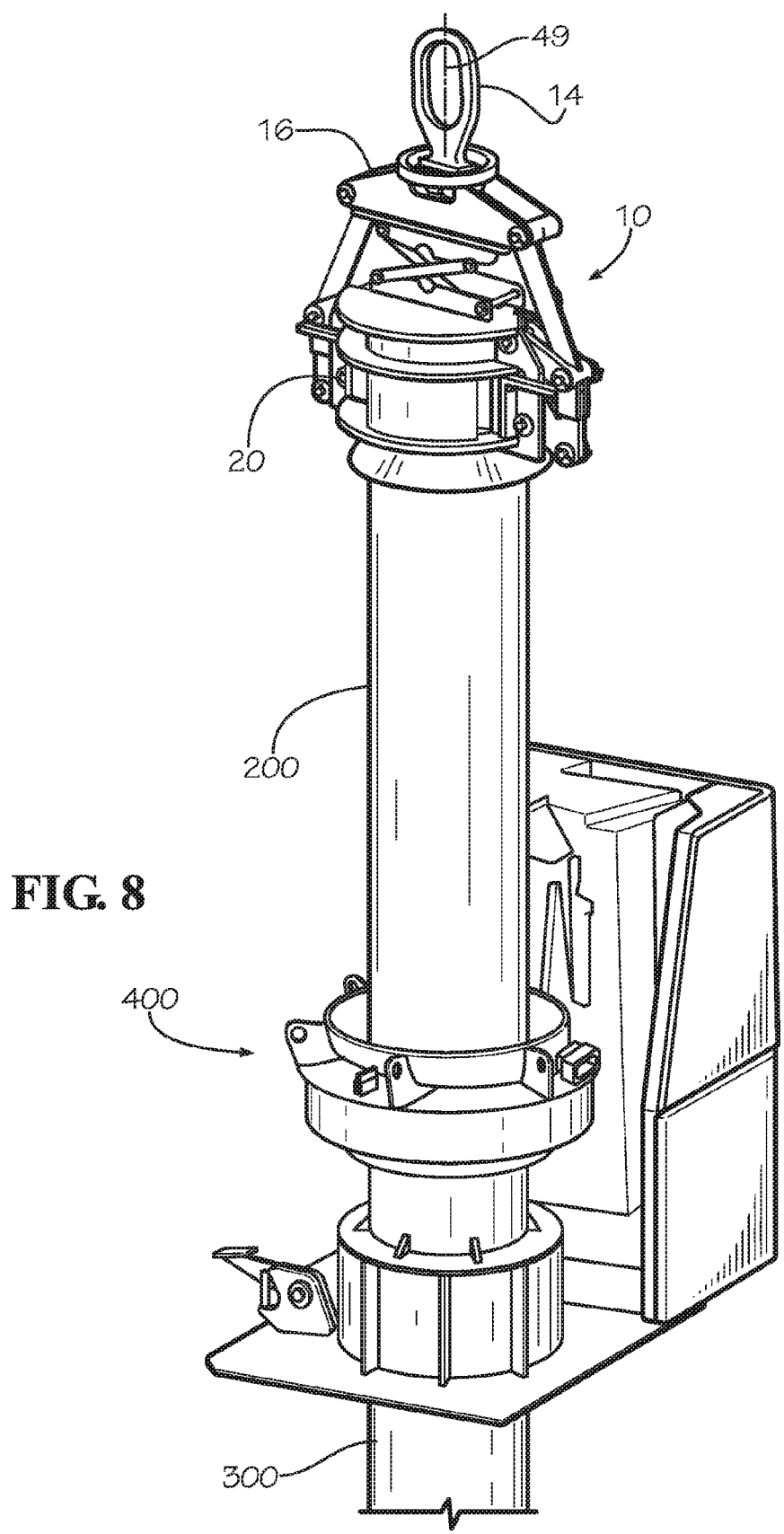
FIG. 8 illustrates a perspective view of an embodiment of a vertical automatic addition tong supporting a free electrode above a fixed electrode mounted in a torque station in accordance with the present disclosure.
Figure 9:
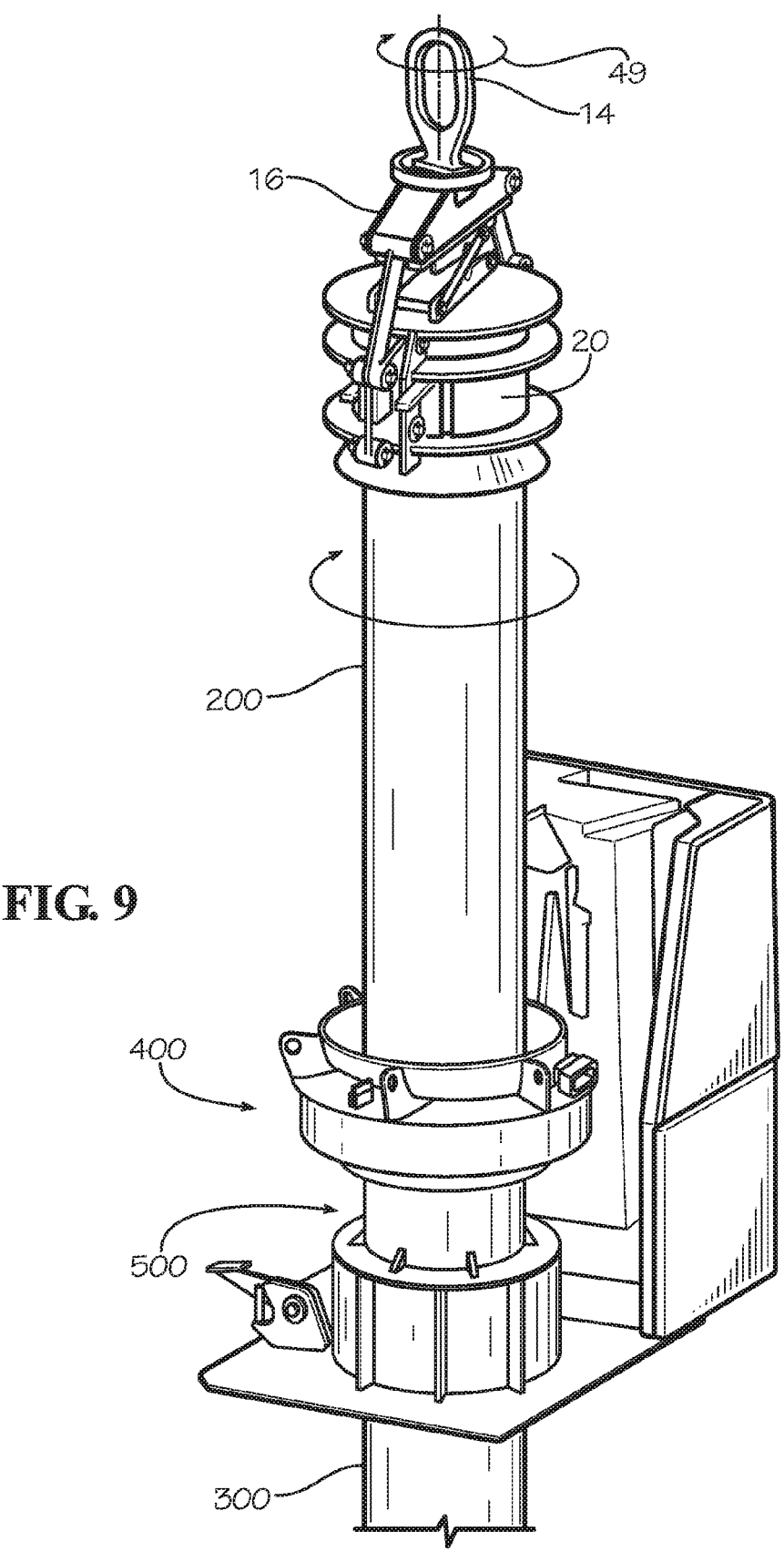
FIG. 9 illustrates a perspective view of an embodiment of a vertical automatic addition tong supporting a free electrode above a fixed electrode mounted in a torque station in accordance with the present disclosure.

During an electrode joining procedure, the lower threaded post 206 on the free electrode suspended below the electrode lifting apparatus 10 is positioned above an open threaded socket on a fixed electrode 300 secured by an electrode holder on a torque station 400, as seen in FIG. 8. The lower electrode lifting apparatus 10 and free electrode 200 are lowered relative to the fixed electrode 300 until the threads on the threaded post 206 are substantially in initial contact with the corresponding threads in the threaded socket on the fixed electrode 300. Once this alignment between the free and fixed electrodes is reached, the torque station 400 engages the free electrode and begins rotating the free electrode about a reference vertical axis 49 to initiate a spin-down stage of electrode joining. During the spin-down stage, the threads between the free and fixed electrodes engage, forming a threaded joint 500 between the free and fixed electrodes, as seen in FIG. 9. As the threaded engagement progresses, a slight downward axial movement is imparted on the free electrode 200 in direction "E" as indicated by the arrow in FIG. 9. The downward axial movement is caused by the threaded advancement of the free electrode 200 axially toward the fixed electrode 300.

During rotation of the free electrode 200 by torque station 400, the free electrode remains clamped and vertically suspended by the electrode lifting apparatus 10. It is important that the entire weight of the free electrode 200 does not fully rest on the threaded engagement between the free and fixed electrodes until the threaded joint between the free and fixed electrodes are fully torqued to the manufacturer's desired torque value. Thus, the electrode lifting apparatus 10 continues to support the mass of the free electrode 200 during a significant portion of the spin-down procedure.

Figure 10:
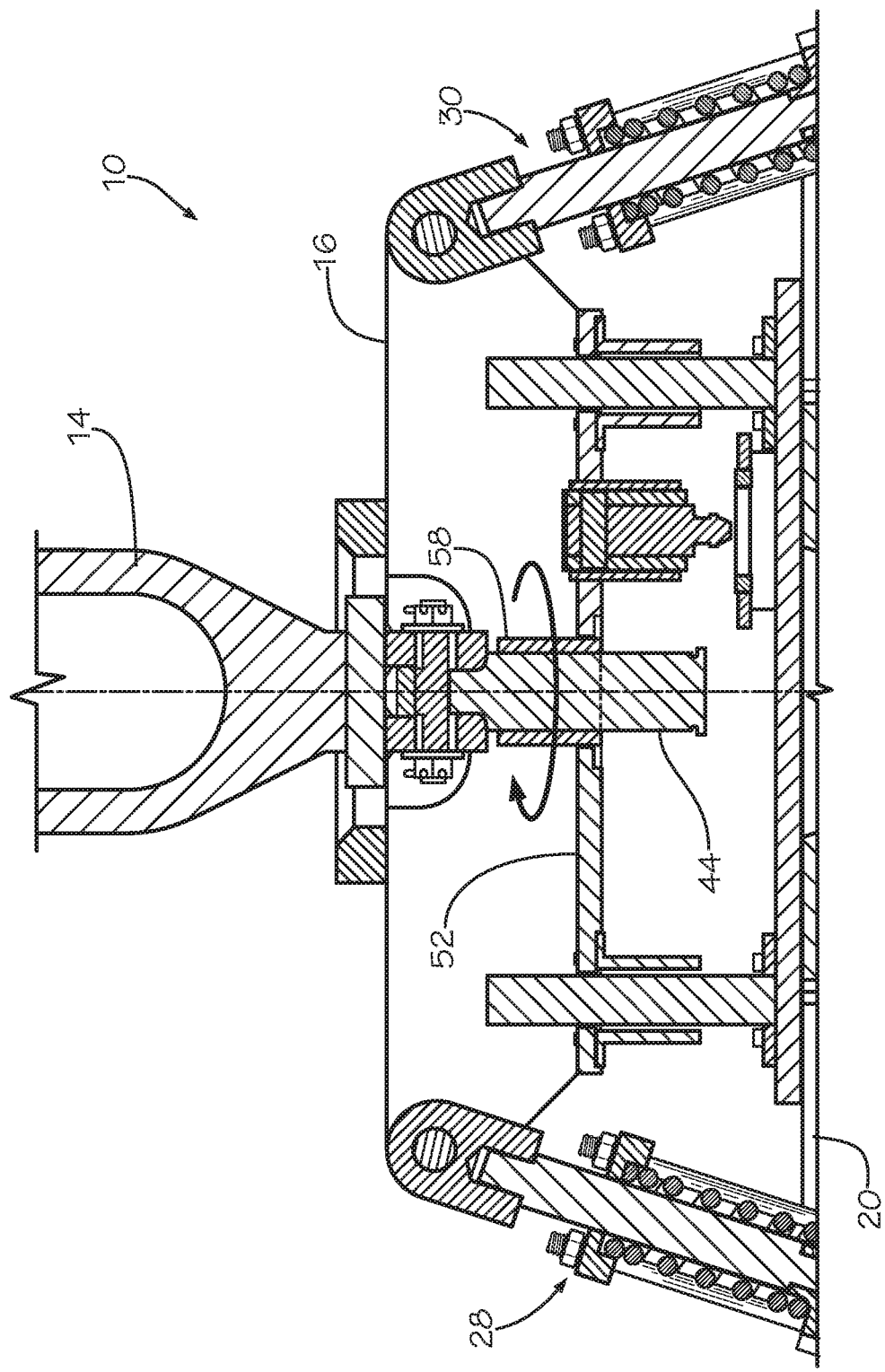
FIG. 10 illustrates a detail partial cross-sectional view of an embodiment of a vertical automatic addition tong showing a threaded engagement between a bail and a yoke on a body.

During the spin-down procedure, bail 14 remains substantially stationary about vertical axis 49. However, due to the driven rotation of free electrode 200 by torque station 400, an angular force is transferred to the electrode lifting apparatus 10. However, as seen in FIG. 10, the threaded connection between bail 14 and body 12 allows the dissipation of the angular force imparted on the electrode lifting apparatus 10 by allowing the body 12 to rotate about the vertical axis 49 relative to the bail 14. More specifically, the threaded stem 44 attached to bail 14 is held relatively angularly stationary about vertical axis 49 during rotation of the free electrode 200 by torque station 400. As the free electrode 200 is rotated, the first and second grips 32, 34 remain engaged with the side wall of the upper end of the electrode 200. The housing 20, yoke 16 and first and second arms 28, 30 all rotate about the threaded stem 44 during rotation of the free electrode 200. This angular movement is allowed due to the threaded engagement between the threaded collar 58 and the threaded stem 44. As such, the threaded engagement between the threaded stem 44 and the threaded collar 58 supports substantially all the mass of the suspended free electrode 200 in some embodiments.

As seen in FIG. 9, once the threaded engagement between the free electrode and the fixed electrode is final and fully torqued, the torque station 400 releases its grip on the free electrode and on the fixed electrode. At this point, the entire electrode column comprising the free electrode and the joined fixed electrode may be moved by the electrode lifting apparatus 10 as a single unit. The entire electrode column may be moved to a desired location on a furnace for further furnace operations using the now combined free and fixed electrodes.

During the joining procedure between the free electrode 200 and the fixed electrode 300, a slight downward axial movement is imparted on the free electrode, as shown by arrow "E" in FIG. 9. In some embodiments, the threaded engagement between the bail 14 and the yoke 16 vial the threaded stem 44 is configured to allow the body 12 to translate vertically downward toward the torque station 300 during free electrode rotation at the same axial rate as the downward translation of the free electrode 200 toward the fixed electrode 300 due to the electrode thread geometry. As such, the axial stress imparted on the system due to the axial translation of the free electrode is reduced. This reduction of axial stress due to both the allowed angular rotation about a vertical axis and simultaneously axial translation of the body 12 relative to the substantially stationary bail 14 reduces wear and prevents damage to the fragile threads on the free and fixed electrodes.

After the combined electrode is positioned on a furnace for further use and locked in place on the electrode feed mechanism on the furnace, the lifting device 10 is no longer required to support the mass of the combined electrode and may be removed. The electrode lifting apparatus 10 may be slightly lowered toward the combined electrode to allow the first and second grips 32, 34 to release from their engagement with the opposing sides of the upper end of the free electrode. As the electrode lifting apparatus 10 is lowered toward the combined electrode, the mass of the electrode lifting apparatus 10 may cause the first and second cams 40, 42 to pivot downwardly relative to the first and second cam pivots 46, 48. This downward camming action causes the first and second grips 32, 34 to be released from the sides of the upper end of the free electrode.

The downward movement of the yoke 16 relative to the housing 20 also allows latch 64 to be actuated causing an engagement between latch 64 and latch retainer 66. When yoke 16 has reached its downward travel limit relative to housing 20, latch 64 is fully secured to latch retainer 66, and the electrode lifting apparatus 10 is in an open position with the first and second grips 32, 34 radially retracted away from the interior of housing 20. As such, the electrode lifting apparatus 10 may be lifted away from the upper end of the combined electrode in the open position. The electrode lifting apparatus 10 is retained in the open position via the engagement between latch 64 and latch retainer 66 until the lifting apparatus is lowered against another object sufficient to cause latch 64 to release from latch retainer 66. The other object may be a ground surface or the upper end of another electrode.

In addition to electrode joining procedures, electrode lifting apparatus 10 may also be used simply for moving electrodes in a vertical orientation from one location to another. The electrode lifting apparatus 10 provides a sufficient grip on the upper end of an electrode to lift and move electrodes of different sizes and lengths in some embodiments.

The electrode lifting apparatus 10, or vertical automatic addition tong 10, is one piece of equipment that may be used in a system for off-furnace joining of electrodes. The vertical automatic addition tong 10 is unique from prior devices for lifting and transporting electrodes in that it may remain a gripping engagement with a free electrode during spin-down of the free electrode while the bail remains substantially stationary and while the body of the lifting apparatus simultaneously rotates and axially translates slightly downwardly during rotation of the free electrode.

For a system of off-furnace electrode joining, the vertical automatic addition tong 10 provides the lifting of a free electrode, the transport of a free electrode to a desired location for an electrode addition procedure, and support of the free electrode during the spin-down rotation and torque of the free electrode. After the free electrode is joined to a second electrode, the vertical automatic addition tong 10 also provides the transport of the combined electrode back to the furnace for attachment to the furnace electrode feed mechanism. After the combined electrode is introduced back onto the furnace, the vertical automatic addition tong 10 may be removed and used for a subsequent operation on a different electrode.

Figure 11:
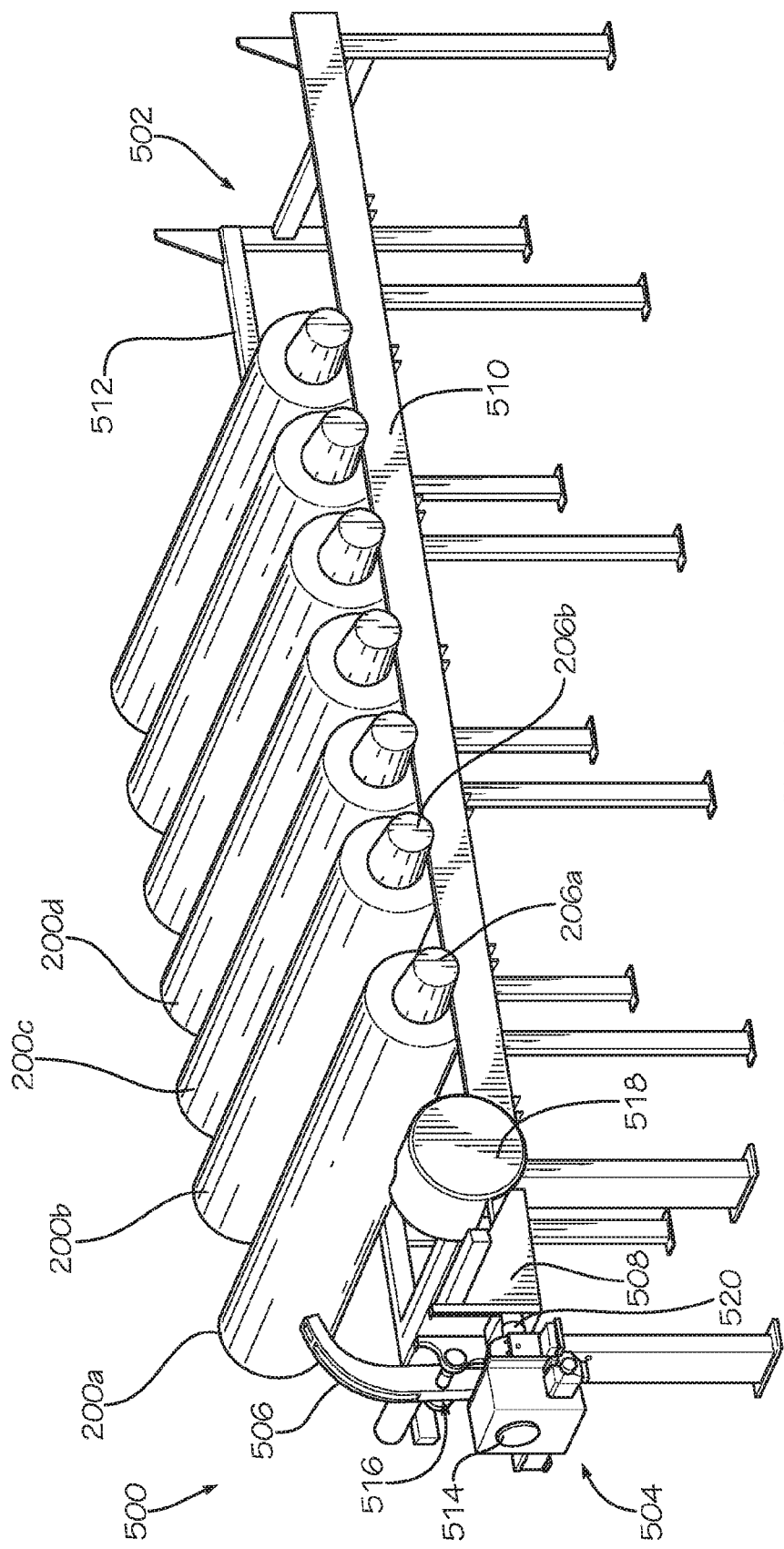
FIG. 11 illustrates a perspective view of an embodiment of an electrode tilt apparatus in accordance with the present disclosure.
Figure 12:
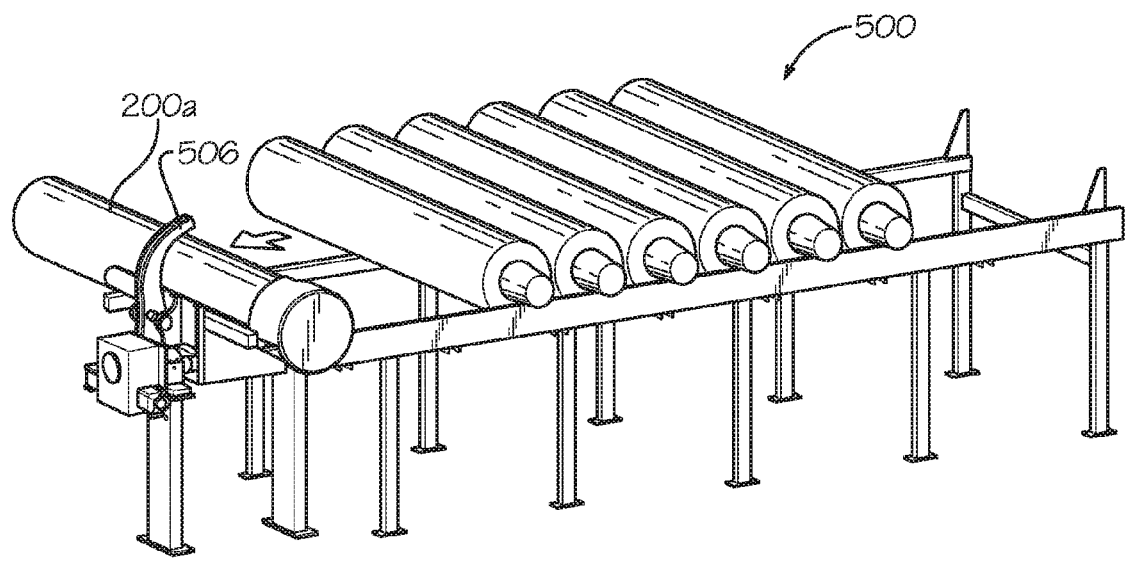
FIG. 12 illustrates a perspective view of an embodiment of an electrode tilt apparatus in accordance with the present disclosure.
Figure 13:
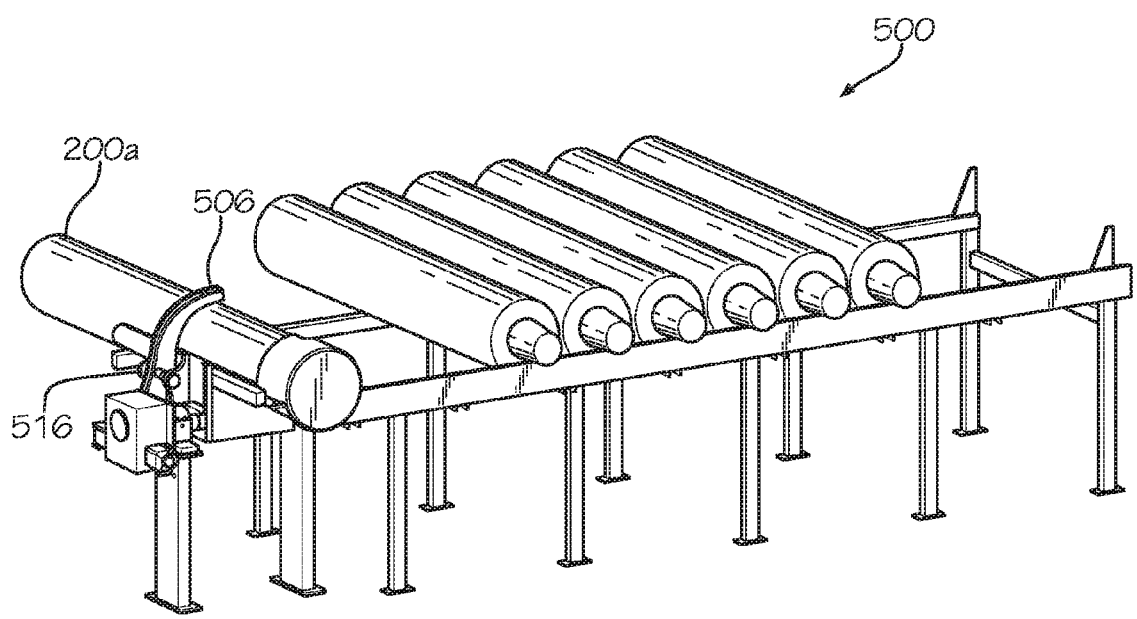
FIG. 13 illustrates a perspective view of an embodiment of an electrode tilt apparatus in accordance with the present disclosure.
Figure 14:
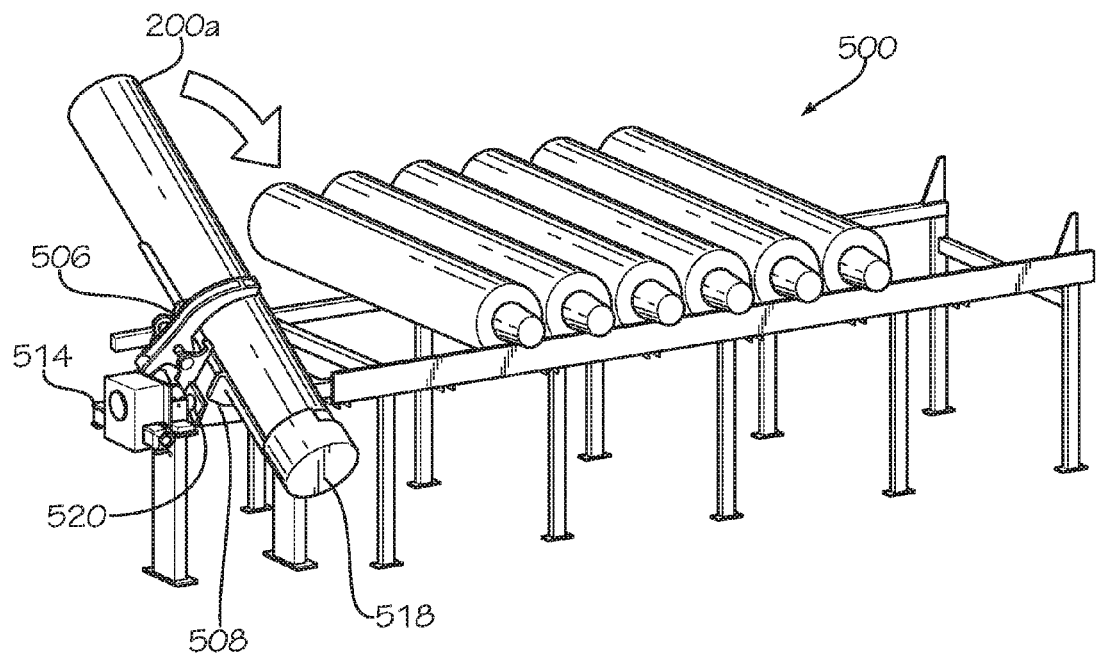
FIG. 14 illustrates a perspective view of an embodiment of an electrode tilt apparatus in accordance with the present disclosure.
Figure 15:
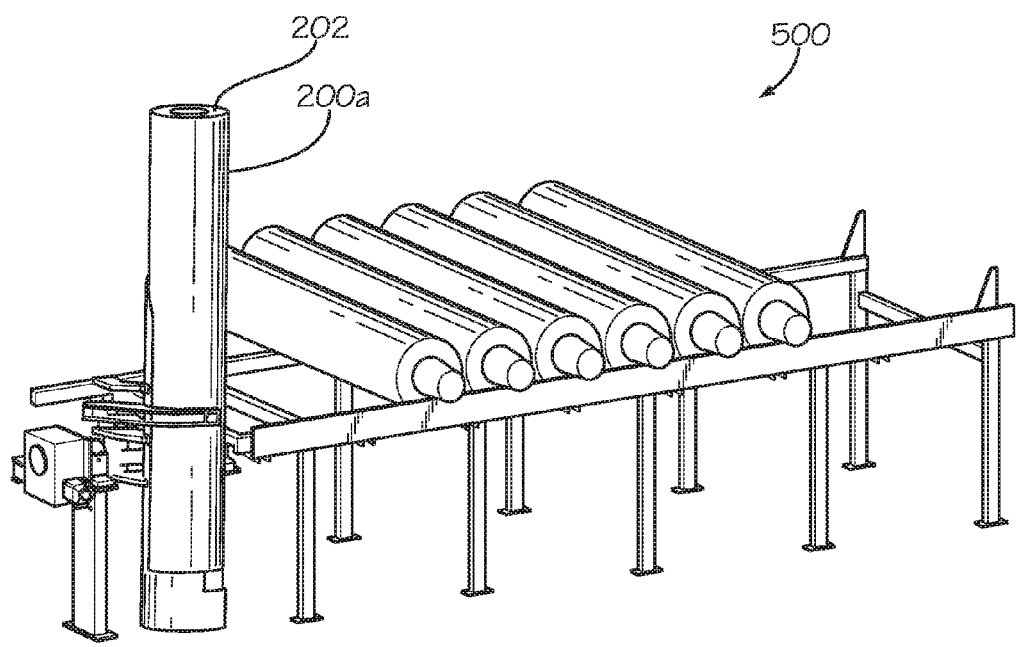
FIG. 15 illustrates a perspective view of an embodiment of an electrode tilt apparatus in accordance with the present disclosure.

For the vertical automatic addition tong 10 to properly function, the free electrode must be positioned in a vertical orientation prior to engagement by the vertical automatic addition tong 10. A separate component of the electrode joining system known as an electrode tilting apparatus 500 may be used to position a free electrode in a desired position for engagement by the electrode lifting apparatus 10. An embodiment of an electrode tilting apparatus 500 is shown in FIGS. 11-15. As shown in FIG. 11, an tilt apparatus 500 includes a plurality of free electrodes 200a, 200b, 200c, 200*d*, etc. Each free electrode rests at a slight incline or in a substantially horizontal position on a frame 502. Frame 502 has a shoulder rail 510 and a side rail 512. Shoulder rail 510 is positioned to engage the lower shoulder 208 on the lower end of a free electrode, as seen in FIG. 7. The shoulder 207 rests against the shoulder rail 510, and the side of each electrode rests against the side rail 512. A carriage 508 is positioned at an end of the frame 502. The carriage 508 is positioned to receive a free electrode on its side, as seen in FIG. 12. Once a free electrode 202*a* is received in the carriage 508, a brace 506 is moved about a brace pivot 516 to apply a downward force against the free electrode 200*a*. The brace 506 may be held in place using an control in actuator 514. Once the brace 506 is secured against the side of the free electrode 200*a*, the carriage is pivoted about a carriage pivot 520 such that the electrode is moved toward an upright, or vertical, position. A carriage base 518 on the carriage 508 receives and secures the threaded lower end of the free electrode 200*a* during the upending process, as seen in FIG. 13 and FIG. 14. Eventually, the free electrode 200*a* is moved to a fully upright, or vertical position where it is held in place until it is needed, as seen in FIG. 15. Once the free electrode 200*a* is needed, an electrode lifting apparatus 10 may be moved into position to grasp the upper end of the free electrode and lift the free electrode to a desired position for joining with another electrode portion.

In further embodiments, the present disclosure provides an off-furnace electrode joining system, comprising: (1) a lifting apparatus as described herein, (2) an electrode tilt apparatus as disclosed herein, and (3) an electrode torque station configured to suspend a fixed electrode and to apply an angular force to a free electrode suspended above the fixed electrode by the lifting apparatus.

In additional embodiments, the present disclosure provides an off-furnace method of joining a free electrode to a fixed electrode, comprising the steps of: (a)

Thus, although there have been described particular embodiments of the present invention of a new and useful Vertical Automatic Addition Tong Apparatus, it is not intended that such references be construed as limitations upon the scope of this invention.

What is claimed is:

1. An electrode lifting apparatus, comprising:
  a body including a yoke and a housing positioned below the yoke, the housing defining an interior space shaped to receive a portion of an electrode;
  a first arm positioned between the yoke and the housing;
  a second arm positioned between the yoke and the housing opposite the first arm;
  a bail positioned above the body connected to the yoke in a threaded engagement such that the yoke is angularly moveable relative to the bail about a reference vertical axis;
  a first grip member linked to the first arm via a first cam, the first cam pivotally attached to the housing between the first grip member and the first arm; and
  a second grip member linked to the second arm via a second cam, the second cam pivotally attached to the housing between the second grip member and the second arm;
  wherein the first and second grip members are moveable relative to the housing toward and away from the interior space in the housing.

2. The apparatus of claim 1, further comprising a bail opening defined in the bail.

3. The apparatus of claim 2, wherein the bail is pivotally attached to the yoke.

4. The apparatus of claim 3, further comprising a bail stop positioned to retain the bail at a bail angle of between about thirty degrees and about sixty degrees relative to a reference horizontal axis.

5. The apparatus of claim 4, wherein the bail stop comprises an annular ring disposed around the bail.

6. The apparatus of claim 5, further comprising a threaded stem attached to the bail.

7. The apparatus of claim 6, wherein the threaded stem provides the threaded engagement between the bail and the yoke.

8. The apparatus of claim 7, further comprising a latch on the yoke.

9. The apparatus of claim 8, further comprising a latch retainer on the housing.

10. The apparatus of claim 9, further comprising:
  a first arm spring disposed on the first arm; and
  a second arm spring disposed on the second arm.

11. The apparatus of claim 10, wherein the yoke is vertically moveable relative to the housing along the reference vertical axis.

12. An electrode lifting apparatus, comprising:
  a bail defining a bail opening;
  a vertical threaded stem attached to the bail; and
  a body positioned below the bail, the body including a yoke and a housing, the housing defining an interior space shaped to receive a portion of an electrode, the yoke attached to the vertical threaded stem in a threaded engagement, wherein the yoke is angularly moveable relative to the bail about a vertical axis;
  wherein the body is angularly moveable relative to the threaded stem about the vertical axis.

13. The apparatus of claim 12, wherein the yoke is vertically moveable relative to the housing along the vertical axis.

* * * * *